United States Patent [19]

Strasser et al.

[11] 3,935,028

[45] Jan. 27, 1976

[54] FUEL CELL SET AND METHOD

[75] Inventors: Karl Strasser; Dieter Hasenauer, both of Erlangen, Germany

[73] Assignee: Siemens Aktiengesellschaft, Munich, Germany

[22] Filed: Sept. 23, 1974

[21] Appl. No.: 508,646

Related U.S. Application Data

[63] Continuation of Ser. No. 261,250, June 9, 1972, abandoned.

[30] Foreign Application Priority Data

June 11, 1971 Germany.......................... 2129134

[52] U.S. Cl............................................ 136/86 C
[51] Int. Cl.²..................... H01M 8/04; H01M 8/06
[58] Field of Search .................................. 136/86 R

[56] References Cited
UNITED STATES PATENTS

| | | | |
|---|---|---|---|
| 3,274,029 | 9/1966 | Lurie | 136/86 C |
| 3,391,027 | 7/1968 | Porter | 136/86 E |
| 3,411,951 | 11/1968 | Gelting | 136/86 R |
| 3,492,163 | 1/1970 | Helmer | 136/86 C |
| 3,629,075 | 12/1971 | Sutbier | 136/86 C |

*Primary Examiner*—John H. Mack
*Assistant Examiner*—H. A. Feeley
*Attorney, Agent, or Firm*—Kenyon & Kenyon Reilly Carr & Chapin

[57] ABSTRACT

An improved fuel cell set for the generation of electrical energy through the reaction of gaseous reactants and a liquid electrolyte which is circulated.

12 Claims, 2 Drawing Figures

FUEL CELL SET AND METHOD

This is a continuation of application Ser. No. 261,250, filed June 9, 1972, now abandoned.

BACKGROUND OF THE INVENTION

This invention relates to a fuel cell set for the generation of electric energy through the reaction of gaseous reactants and a liquid electrolyte which is circulated through the fuel cell set, as well as a method for operating this fuel cell set.

Fuel cells and fuel cell batteries generate electric energy in the form of direct current from chemical energy, for instance using hydrogen and oxygen. The efficiency is about 50 to 60%. With fuel cells connected in series, the available current depends on the size of the active area of the individual cells and the permissible area loading; the voltage depends on the number of cells. Heat is generated during the electrochemical reaction in which the chemical energy is converted into electric energy. This heat must be removed by means of a collant, such as water. As a rule, as much heat must be removed in a fuel cell battery by the coolant as the amount of useful energy that is taken from the battery. In addition to the reaction heat, reaction water is also produced in the electrochemical conversion, about 0.5 liter of water being produced per kilowatt-hour.

Since fuel cell batteries always consist of a fairly large number of cells which are electrically connected in series or in parallel because of the relatively low voltage of the individual cells, large units result when fuel cell batteries of large power rating are constructed. In addition and in contrast to classical batteries and storage cells, fuel cell batteries, moreover, require a number of auxiliary devices for continuous operation. On the other hand, such fuel cell batteries must meet certain requirements for specific application. For instance, if the field of locomotion or traction, such as in applications for mobile systems, they must be capable of functioning without inordinate sensitivity in inclined positions.

SUMMARY OF THE INVENTION

This invention relates to an improved fuel cell set for the generation of electrical energy through the reaction of gaseous reactants and a liquid electrolyte, which is circulated. In particular, the weight per unit of output power and the volume, respectively, and the required space are reduced by arranging the individual parts of the fuel cell set in optimum position for operation.

According to the invention, this is accomplished by providing a fuel cell set which contains, in compact construction within one housing, at least one fuel cell battery which is built up of a plurality of fuel cells, an electrolyte regenerator, a pressure lock, a heat exchanger, a supply tank and a control unit. These individual building blocks are arranged in this order and preferably having the same cross-sectional dimensions. The gaseous reactants and a coolant are fed in and discharged on the side of the fuel cell set on which the control unit is positioned. In the electrolyte circuit, the supply tank is connected with the fuel cell battery, and the latter is connected again to the supply tank via the electrolyte regenerator and the heat exchanger.

Such a fuel cell set has numerous advantages. The design of the fuel cell set as an integrated structural unit, i.e., as a block, is particularly advantageous for manufacturing reasons. Plumbing and lines between individual units, which are necessary with the separate type of construction, are eliminated. The end plates required for the respective individual parts are also partly eliminated, due to the compact construction. The subdivision of the energy-generating part into several fuel cell batteries has the advantage that deviations from the uniform distribution of the electrolyte flow in all electrolyte chambers which may occur in large battery blocks, are avoided. As the electrolytic liquid flows through the individual fuel cells of fuel cell batteries in parallel for the purpose of removing the reaction water and the reaction heat, they are electrically short-circuited via the electrolyte ducts.

Although the electric power losses can be reduced to the extent that the duct cross-sections for the electrolyte supply are made smaller, the pumping power required for the removal of the reaction heat and the reaction water increases as the duct geometry becomes smaller. Moreover, there is also the previously mentioned problem of uniform distribution of the flow. As the cell with the poorest flow must still be supplied with a minimum flow of electrolytic liquid, the total required volume flow, i.e., the pump power, is increased. It is therefore advantageous to combine the fuel cells, which are required in total to achieve a given power output, into several fuel cell batteries.

The fuel cell set of this invention is also distinguished by the fact that all lines and connections between the individual parts of the set are accommodated within a common housing, and specifically in its peripheral zones. This leads to compact construction without external plumbing. All required lines for the reactants, the electrolytic liquid and the coolant are integrated in this structural unit. The unit has connections to the outside for the gaseous reactants, such as hydrogen and oxygen, for the coolant, for removing the reaction water formed and for ventilation, i.e., for removing the residual gas, as well as terminals for the current.

A characteristic feature of the structural unit is the closed electrolyte cycle, which serves also for the removal of the heat and the water. A centrifugal pump with a direct drive by a commutatorless split-housing d-c motor is used for circulating the electrolytic liquid. The pump draws electrolytic liquid without pressure from a supply tank and delivers the same directly to the fuel cell battery, where it flows in parallel through all the fuel cells. The electrolytic liquid is heated in the process by the reaction heat and is diluted by the reaction water formed. After flowing through the fuel cell battery, the electrolytic liquid is fed in parallel streams through an electrolyte regenerator as well as through a heat exchanger. In the electrolyte regenerator, the reaction water is removed from the electrolytic liquid through evaporation of water, as well as part of the heat of reaction. The balance of the reaction heat is transferred in the heat exchanger from the electrolytic liquid to the coolant, which may for instance be cooling water. As more reaction heat is produced in the fuel cell battery than is required for the removal of the reaction water, more water is removed from the electrolytic liquid, as temperature control is employed, than reaction water was formed, i.e., the concentration of the electrolytic liquid would rise continuously.

For this reason, an additional circuit element is provided for the control of the electrolyte concentration, which either gives off the reaction water depleted in the electrolyte regenerator to the outside if the concentration is too low, or returns it to the electrolyte cycle if the concentration is too high. It is important here that fluctuations in the concentration stay within narrow limits, as they result in volume fluctuations. Furthermore, loss of electrolytic liquid must be avoided in order to reduce maintenance. Such losses of electrolytic liquid are possible through the presence of electrolytic liquid in the removed reaction water and through droplets of electrolyte in the reaction gases or their inert-gas components within the fuel cell battery, which can occur through the passing of electrolytic liquid into the gas chambers.

Loss of electrolytic liquid is prevented on the one hand by the provision that the reaction water is released to the outside only when it exhibits neutral reaction, which is possible through monitoring the electric conductivity. On the other hand, the loss of electrolytic liquid as droplets through their presence in the reaction gases or their inert-gas components is prevented by the provision that the unspent reaction gases or their inert-gas components, respectively, i.e., the residual gas, are not given off directly into the environment after flowing through the last fuel cell, but are first returned to the supply tank for the electrolytic liquid and are then discharged to the outside.

In fuel cell sets, insensitivity to inclination is of particular importance. This is true especially for the application of fuel cell sets in traction systems. Since about 90% of the electrolytic liquid is situated in the electrolyte chambers of the fuel cell battery, the electrolyte regenerator and the heat exchanger, the entire electrolyte supply would flow back into the tank and flow out through the vent holes of the tank if the fuel cell set were in an inclined position. This could happen in the event that the installation is shut off, or if trouble develops, such as if the electrolyte pump stops in a situation where the flow of electrolyte goes directly into the battery via the pump and a pressure line, i.e., if the supply tank is directly connected with the battery in the bottom of the fuel cell set. This is prevented by running the lines in a manner which will be explained in the following description.

The electrolytic liquid is first pumped through an electrolyte duct in the upper part of the housing of the fuel cell set from the supply tank through the entire fuel cell set to that end of the set in which the fuel cell battery is situated. There, the electrolytic liquid is conducted, for instance, in the end plate, into the lower part of the fuel cell set. Then, the electrolytic liquid is conducted in parallel paths through the individual fuel cells from the bottom to the top. If several fuel cell batteries are present in the set, a separate main duct in the lower part of the housing is provided for each individual battery. After flowing through the fuel cells, the electrolytic liquid is returned in the upper part of the battery to the end of the fuel cell set on the battery side of the set, and if necessary, i.e., if several batteries are present, in several main ducts. At the end of the set, the electrolytic liquid is collected, reversed and fed in a common duct to the electrolyte regenerator. There, it is conducted again into the lower part of the fuel cell set, specifically, through a reversing cell, and then flows in parallel paths from the bottom to the top of the fuel cell set through the electrolyte regenerator as well as through the heat exchanger. If in fuel cell sets of large rated output, a large number of electrolyte chambers exists in the electrolyte regenerator as well as in the heat exchanger, it is advantageous in order to obtain uniform distribution of the flow, to combine the electrolyte chambers in the electrolyte regenerator as well as in the heat exchanger, corresponding to the arrangement in several fuel cell batteries, to form two or more units which are provided with separate ducts for feeding in and discharging the electrolytic liquid. After flowing through the electrolyte regenerator and the heat exchanger, the electrolytic liquid is collected, returned into the electrolyte regenerator in a common duct, again reversed there and finally transported back to the supply tank. In this manner the electrolyte chambers are prevented from running empty in case of trouble or if the battery is shut down. Discharge of the electrolytic liquid from the supply tank is also prevented if the fuel cell set is in an inclined position.

Finally, reaction gases could also pass through leaks from the gas chambers into the electrolyte chambers and push the electrolytic liquid from the fuel cell battery back into the supply tank, if the pump is standing still and gas chambers are under pressure, whereby the liquid then could escape through the venting line. This can be prevented advantageously by a bypass line, which connects the battery outlet, i.e., a reversing cell for the electrolytic liquid, which is arranged between the fuel cell battery and the electrolyte regenerator, with the supply tank. Thereby, the gas that has passed into the electrolyte chambers can be removed from the battery without the previously mentioned disturbances taking place.

In the shut-down condition the fuel cell set is separated from the pressure-gas lines for the reaction gases by diaphragm valves. When the set is to be started up, one of the reaction gases, for instance, hydrogen is conducted through a pneumatic, manually operated valve via a control line and a reducing valve, into the electrolyte regenerator, and specifically, into the condensation chambers of the water depletion units. A gas pressure is thereby produced in these condensation chambers which supports the asbestos diaphragms that separate the condensation chambers from the electrolyte chambers and serve for diffusing the reaction water from the electrolytic liquid, against the pressure of the electrolytic liquid which appears when the battery is turned on. When a minimum pressure, for instance about 0.13 N/mm$^2$ (1.3 kg/cm$^2$), is reached, a diaphragm valve is opened in the control unit of the fuel cell set for each of the two reactants, whereby the reactants can flow into the fuel cell set. Through the chemical reaction which then begins, a voltage is generated. Upon reaching a lower voltage limit, the control pressure for the two diaphragm valves is switched on via a magnetic valve and the pneumatic valve is switched off. The fuel cell set is now ready for operation and is controlled automatically. In order to prevent the fuel cell set from being turned on by itself due to defective diaphragm valves, the pneumatic valve may be coupled with an electric valve.

The diaphragm valve for the oxidant, for instance oxygen, can advantageously be preceded by a choke, whereby this diaphragm valve is opened later than the diaphragm valve for the fuel, for instance hydrogen. Thus, the fuel flows into the fuel cell battery first, followed by the oxidant. If the battery is started up under load, it could be possible that the potential reaches a value which is less negative than the critical hydrogen potential of −780 mV as measured again Hg/HgO, if the hydrogen and the oxygen flow simultaneously into the gas chambers of the fuel cells, which could cause damage to the hydrogen electrode. This is prevented by the use of the choke.

In the fuel cell set according to the invention, all auxiliary control devices, such as valves, are mounted on a common base plate, which is adjacent to the electrolyte supply tank and forms the boundary of the fuel cell set on one side.

The reaction gases are led through the fuel cell battery, i.e., through the gas chambers, in the fuel cell set in cascade fashion. In this process, inert-gas components accumulate in the last stage of the cascade, which for instance, consists of one cell, whereby the voltage of the last stage of the cascade drops. Through comparison with the average cell voltage, a singal is obtained which is used electronically to open a valve, whereby the inert components are purged and the voltage rises again. The purging device is protected against failure by monitoring the battery voltage. If the temperature or the voltage monitoring device responds, the previously mentioned magnetic valve closes and simultaneously vents the control circuit. As a result, the diaphragm valves close, the purging valves open and the voltage breaks down. By using the pressure energy contained in the reaction gases and the pneumatic-electrical control, auxiliary electric power for starting the fuel cell set can be dispensed with.

DETAILED DESCRIPTION

Figure 1:
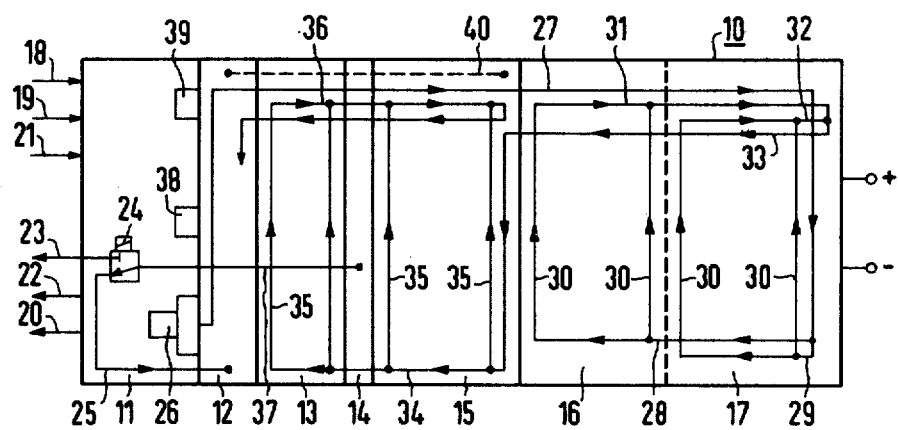
FIG. 1 is a schematic illustration of a fuel cell showing its major components and the electrolyte lines.

Referring to FIG. 1 the fuel cell set 10 contains within one housing the following individual building blocks arranged in the following order and preferably having the same cross-sectional dimensions: a control unit 11, a supply tank 12 for the electrolyte, a heat exchanger 13, a pressure lock 14, an electrolyte regenerator 15 and two fuel cell batteries 16 and 17.

The reaction gases, hydrogen and oxygen, are fed to the fuel cell set 10 on the side of the control unit 11. Hydrogen is fed in through hydrogen line 18 and oxygen is fed in through oxygen line 19. The gas residue, i.e., the unspent reaction gases or their inert-gas components, respectively, leave the fuel cell set 10 through gas residue line 20. Coolant is supplied to the fuel cell set 10 through coolant supply line 21 and is discharged through coolant discharge line 22.

The reaction water produced during the electrochemical reaction in the fuel cell batteries is removed from the fuel cell set 10 through reaction water discharge line 23. A magnetic valve 24 controls the discharge of reaction water through reaction water discharge line 23 and also controls the return of reaction water to the supply tank 12 through reaction water return line 25.

Electrolyte pump 26 transports the electrolytic liquid in a cycle through the fuel cell set 10. The path of the electrolytic liquid is indicated in FIG. 1 by the arrows. The electrolytic liquid flows through electrolyte duct 27, then enters the two main ducts 28 and 29 and then flows through the electrolyte chambers of the individual fuel cells (which are not shown in FIG. 1) of the fuel cell batteries 16 and 17 through battery lines 30. After flowing through the fuel cells, the electrolytic liquid is returned through main ducts 31 and 32 to the end of the fuel cell set 10 on the battery side. The electrolytic liquid is collected and fed through a common duct 33 to the electrolyte regenerator 15.

In the electrolyte regenerator 15, the electrolytic liquid is led down through a reversing cell, which is not shown in FIG. 1. The electrolyte regenerator 15 also contains a plurality of water depletion units, not shown in FIG. 1. Each water depletion unit consists of an electrolyte chamber, a condensation chamber separated from the electrolyte chamber by an asbestos diaphragm, and a cooling chamber which is separated from the condensation chamber by a non-porous condensation surface. As indicated by the reference numerals 35, the electrolyte flows, starting from a common line 34, in parallel paths through the electrolyte chambers of the electrolyte regenerator and of the heat exchanger 13.

In heat exchanger 13, the electrolyte chambers and the cooling chambers are arranged next to each other. The coolant which keeps the electrolytic liquid at the desired temperature flows through the cooling chambers. After flowing through the electrolyte chambers of the electrolyte regenerator 15 and the heat exchanger 13, the electrolytic liquid is returned through a common duct 36 into the electrolyte regnerator 15. The electrolytic liquid is reversed in the electrolyte regenerator 15 and is finally transported back to the supply tank 12.

The reaction water condensed in the condensation chambers (not shown) of the electrolyte regenerator 15 is transported by means of an auxiliary gas which is fed to the electrolyte regenerator 15, i.e., to the condensation chambers of the water depletion units (not shown), into the pressure lock 14. The pressure lock 14 consists of a gas chamber which is separated from a liquid chamber by a liquid-permeable asbestos diaphragm. From the condensation chambers of the water depletion unit in the electrolyte regenerator 15, the reaction water flows into the gas chamber of the pressure lock 14 and is pushed through the asbestos membrane into the liquid chamber by means of the auxiliary gas. The reaction water goes from the liquid chamber through line 37 to the end of the fuel cell set 10 at the side adjacent to the control unit 11. The reaction water is either discharged to the outside by means of magnetic valve 24 through reaction water discharge line 23 or the reaction water is returned to the supply tank 12 for the electrolytic liquid.

A concentration sensor 38 and a temperature sensor 39 are attached to the supply tank 12 to monitor the electrolytic liquid. A bypass line 40 connects the output of the fuel cell battery 16, i.e., the reversing cell that is not shown in FIG. 1, with the supply tank 12. A choke of small cross section or a bypass valve may be arranged in the bypass line 40 so that it is closed when the fuel cell set 10 is in operation and is open when the fuel cell set 10 is shut down.

Figure 2:
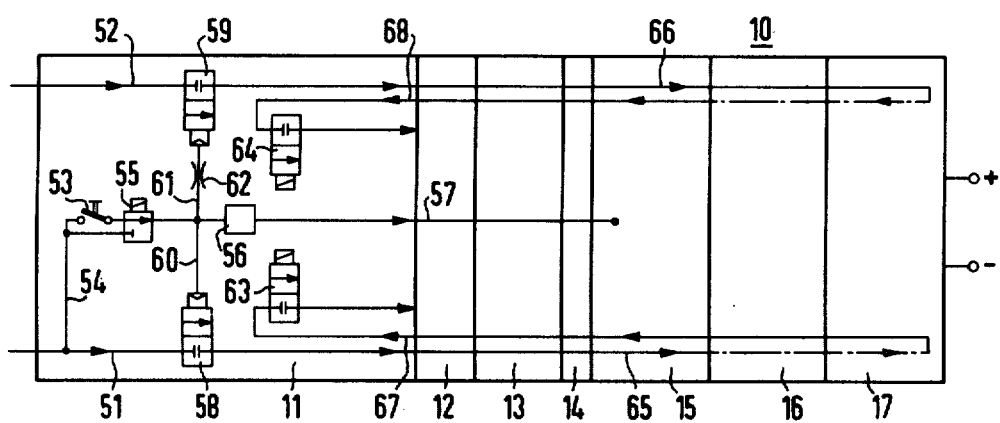
FIG. 2 is a schematic illustration of the fuel cell of FIG. 1 showing the auxiliary control devices for the fuel cell of FIG. 1.

FIG. 2 shows auxiliary control devices which serve for the start control of the fuel cell set 10 and which are accommodated in the control unit 11. Similar parts are labeled with the same reference numerals in both FIG. 1 and FIG. 2. The devices in control unit 11 which are shown in FIG. 1 are not shown again in FIG. 2.

Referring to FIG. 2, hydrogen is fed to the fuel cell set 10 through hydrogen supply line 51. Oxygen is fed to the fuel cell set 10 through oxygen supply line 52. Upon starting the fuel cell set 10, penumatic valve 53 is closed to allow hydrogen to flow through control line 54, magnetic valve 55, reducing valve 56 and line 57 into the condensation chambers of the electrolyte regenerator 15.

Upon reaching a minimum pressure, diaphragm valves 58 and 59 in the respective feed lines for the hydrogen and oxygen open and allow these gases to flow into the battery through lines 65 and 66.

Upon reaching a minimum pressure, hydrogen diaphragm valve 58 in the feed line for the hydrogen opens and allows hydrogen gas to flow into the battery through the hydrogen line 65. Also upon reaching minimum pressure, oxygen diaphragm valve 59 in the feed line for the oxygen opens and allows oxygen gas to flow into the battery through oxygen line 66. For this purpose diaphragm valve 58 and 59 are connected to line 57 by lines 60 and 61 respectively. A choke 62 is arranged in line 61 whereby diaphragm valve 59 for the oxidant, e.g. oxygen is opened later than disphragm valve 58 for the fuel, e.g. hydrogen.

When the voltge of the fuel cell set 10 reaches a lower limit, the control pressure for the diaphragm valves 58 and 59 is switched on by magnetic valve 55 and pneumatic valve 53 is released, the fuel cell set 10 is then ready for operation and is controlled automatically.

The reaction gases flow through the individual fuel cells in cascade fashion. The discharge of the unspent reaction gases or their inert-gas components flow, respectively, from the fuel cell set 10 is controlled via valves 63 and 64. Hydrogen discharge valve 63 controls the discharge of hydrogen through hydrogen discharge line 67. Oxygen discharge valve 64 controls the discharge of oxygen through oxygen discharge line 68. Before leaving the fuel cell set 10, these gases are conducted to the electrolyte supply tank 12 and then removed from the fuel cell set 10 as gas residue.

In the foregoing description the invention has been described in reference to specific exemplary embodiments and methods. It will be evident, however, that variations and modifications in the embodiments and methods explained by way of illustration may be made without departing from the broader scope and spirit of the invention as set forth in the appended claims. The specification and drawings are accordingly to be regarded in an illustrative rather than in a restrictive sense.

What is claimed is:

1. A fuel cell set for the generation of electric energy through the reaction of gaseous reactants and a liquid electrolyte which is circulated, the fuel cell set comprising:

a housing of compact construction;

a plurality of fuel cells which are combined into at least one fuel cell battery disposed within said housing;

an electrolyte regenerator, disposed adjacent said fuel cells within said housing, which removes reaction water from the electrolytic liquid, said electrolyte regenerator including a plurality of water depletion units each comprising an electrolyte chamber, a condensation chamber, an asbestos diaphragm which separates said electrolyte chamber from said condensation chamber, a cooling chamber, and a non-porous condensation surface which separates the cooling chamber from said condensation chamber, and said electrolyte chambers of said water depletion units being coupled by an electrolyte flow line to the electrolyte chambers of said fuel cells;

a pressure lock, disposed adjacent said regenerator within said housing through which the reaction water flows, said pressure lock comprising a gas chamber, a liquid chamber, and a liquidpermeable asbestos diaphragm which separates the liquid chamber from said gas chamber, and said pressure lock gas chamber being coupled to said electrolyte regenerator condensation chambers;

a heat exchanger, disposed adjacent said pressure lock within said housing, having a coolant which removes heat from the electrolyte and cooling chambers, said heat exchanger electrolyte chambers being coupled to said electrolyte regenerator electrolyte chambers;

a supply tank for the electrolytic liquid disposed adjacent said heat exchanger and coupled by a plurality of electrolyte flow lines to the electrolyte chambers of said electrolyte regenerator and said fuel cells within said housing; and a control unit, disposed adjacent said tank within said housing, which controls the flow of gaseous reactants, electrolytic liquid and reaction water and through which the gaseous reactants and coolant are supplied to and discharged from said fuel cell set, said gaseous reactants and said coolant being supplied to and discharged from said fuel cells and said heat exchanger, respectively, on the side of said fuel cell set on which said control unit is disposed, said control unit including valve means, coupled to said pressure lock and supply tank for controlling the reaction water discharge flow and returning said reaction water to said supply tank thereby controlling the electrolyte concentration; a pump for pumping said electrolyte through said fuel cell set; a pneumatic valve to allow hydrogen to flow to the electrolyte regenerator upon starting the fuel cell set; a control line, magnetic valve and reducing valve through which the hydrogen flows to the electrolyte regenerator; feed lines for the oxygen and hydrogen reactants; an oxygen diaphragm valve in the feed line for the oxygen; a hydrogen diaphragm valve in the feed line for the hydrogen; a choke which opens the oxygen diaphragm valve later than the hydrogen diaphragm valve; discharge lines for the oxygen and hydrogen residue; an oxygen discharge valve in the discharge line for the oxygen residue; and a hydrogen discharge valve in the discharge line for the hydrogen residue.

2. A fuel cell set as recited in claim 1, wherein said fuel cells, regenerator, pressure lock, heat exchanger, tank and control unit are coupled by lines disposed within said housing and have the same cross-sectional structural dimensions.

3. A fuel cell set as recited in claim 1 and further comprising a bypass line coupled to said fuel cell battery and said supply tank.

4. A fuel cell set according to claim 3 and further comprising a bypass valve in said bypass line.

5. A fuel cell set according to claim 1 and further comprising a separate main duct for the electrolytic liquid in the lower part of the housing for each fuel cell battery.

6. A fuel cell set according to claim 1, wherein said electrolyte regenerator and heat exchanger electrolyte chambers are combined to correspond to the arrangement in the fuel cell batteries and form a plurality of units which are provided with separate ducts for feeding in and discharging the electrolytic liquid.

7. A fuel cell set according to claim 1, wherein the electrolyte regenerator further comprises a reversing cell.

8. A fuel cell set according to claim 1, and further comprising a concentration sensor and a temperature sensor which are attached to the supply tank to monitor the electrolytic liquid.

9. Method for operating a fuel cell set for the generation of electric energy through the reaction of gaseous reactants and a liquid electrolyte which is circulated, comprising:

pumping the electrolytic liquid through an electrolyte duct in the upper part of a fuel cell set housing from an electrolytic liquid supply tank through the entire fuel cell set to one end of at least one fuel cell battery;

then conducting the electrolytic liquid to the lower part of the fuel cell set and through a separate main duct for the electrolytic liquid provided in the lower part of the housing for each fuel cell battery;

then conducting the electrolytic liquid from the bottom to the top of the fuel cell set in parallel paths through individual fuel cells;

then returning the electrolytic liquid to said end of the fuel cell battery;

collecting the electrolytic liquid, reversing the direction of flow thereof and conducting it in a common duct to an electrolyte regenerator;

then conducting the electrolytic liquid within the electrolyte regenerator into the lower part of the fuel cell set;

then conducting the electrolytic liquid from the bottom to the top of the fuel cell set using parallel paths through the electrolyte regenerator and a heat exchanger;

collecting the electrolytic liquid and returning it in a common duct to the electrolyte regenerator; and reversing the direction of flow of the electrolytic liquid in the electrolyte regenerator and transporting it back to the supply tank.

10. Method for operating a fuel cell set for the generation of electrical energy through the reaction of gaseous reactants and a liquid electrolyte comprising:

starting up the fuel cell set by conducting one of the reaction gases into an electrolyte regenerator through a control line, a pneumatic valve, and a reducing valve;

opening each of a pair of diaphragm valves for each of two reactants in a control unit upon reaching a minimum pressure in the regenerator to admit the reactants to the fuel cell set;

switching on a control pressure for the diaphragm valves upon the generating of a lower voltage limit by the fuel cell set by means of a magentic valve; and switching off the pneumatic valve.

11. Method according to claim 10 wherein the diaphragm valves admit an oxidant and a fuel to the fuel cell set, and the valve for the oxidant is opened by means of an inserted choke later than the diaphragm valve for the fuel.

12. A fuel cell set as recited in claim 1, wherein said supply tank further comprises a venting line.

* * * * *